(12) United States Patent
Tseng et al.

(10) Patent No.: US 9,247,141 B2
(45) Date of Patent: Jan. 26, 2016

(54) BURST IMAGE CAPTURE METHOD AND IMAGE CAPTURE SYSTEM THEREOF

(71) Applicant: HTC Corporation, Taoyuan County (TW)

(72) Inventors: Fu-Chang Tseng, Taoyuan County (TW); Sung-Hao Lin, Taoyuan County (TW); Li-Chun Hsu, Taoyuan County (TW); Jeng-Yu Yeh, Taoyuan County (TW); Jing-Lung Wu, Taoyuan County (TW); Hsin-Ti Chueh, Taoyuan County (TW)

(73) Assignee: HTC Corporation, Taoyuan District, Taoyuan (TW)

( * ) Notice: Subject to any disclaimer, the term of this patent is extended or adjusted under 35 U.S.C. 154(b) by 28 days.

(21) Appl. No.: 13/773,562

(22) Filed: Feb. 21, 2013

(65) Prior Publication Data

US 2013/0222671 A1   Aug. 29, 2013

Related U.S. Application Data

(60) Provisional application No. 61/602,616, filed on Feb. 24, 2012.

(51) Int. Cl.
*H04N 5/232* (2006.01)

(52) U.S. Cl.
CPC ....... *H04N 5/23293* (2013.01); *H04N 5/23216* (2013.01); *H04N 5/23245* (2013.01)

(58) Field of Classification Search
CPC .......... H04N 5/23245; H04N 5/23293; H04N 5/23216
USPC ................. 348/220.1, 222.1, 231.99, 333.05, 348/333.11, 333.12
See application file for complete search history.

(56) References Cited

U.S. PATENT DOCUMENTS

| 5,884,005 | A | 3/1999 | Peters | |
|---|---|---|---|---|
| 6,992,707 | B2* | 1/2006 | Obrador | G06T 3/4015 348/207.99 |
| 7,199,829 | B2* | 4/2007 | Matsui | H04N 1/6011 348/333.02 |
| 7,787,026 | B1* | 8/2010 | Flory | H04N 1/2166 348/231.99 |
| 2001/0020978 | A1 | 9/2001 | Matsui | |
| 2004/0090548 | A1* | 5/2004 | Obrador | 348/333.01 |
| 2010/0225798 | A1* | 9/2010 | Lim | 348/333.05 |
| 2011/0019936 | A1* | 1/2011 | Bhrugumalla | 382/298 |

FOREIGN PATENT DOCUMENTS

| DE | 695 17 298 T2 | 1/2001 |
|---|---|---|
| EP | 0 724 810 B1 | 5/2000 |
| WO | 2011052457 A1 | 5/2011 |

OTHER PUBLICATIONS

Office action mailed on Dec. 23, 2013 for the Germany application No. 10 2013 203 008.8, p. 1-6.
Office action mailed on Oct. 8, 2015 for the China application No. 201310055266.1, filing date Feb. 21, 2013.

* cited by examiner

*Primary Examiner* — Ahmed A Berhan
(74) *Attorney, Agent, or Firm* — Winston Hsu; Scott Margo

(57) ABSTRACT

The present invention discloses an image capture method comprises capturing a sequence of image frames; providing the sequence of image frames for preview along a first path and buffering the sequence of image frames into a buffer along a second path separately and concurrently; receiving an input command via an input interface unit; and in response to the input command, extracting a portion of the sequence of image frames from the buffer and encoding the portion of image frames along the second path; and storing the portion of encoded image frames in a memory unit.

20 Claims, 5 Drawing Sheets

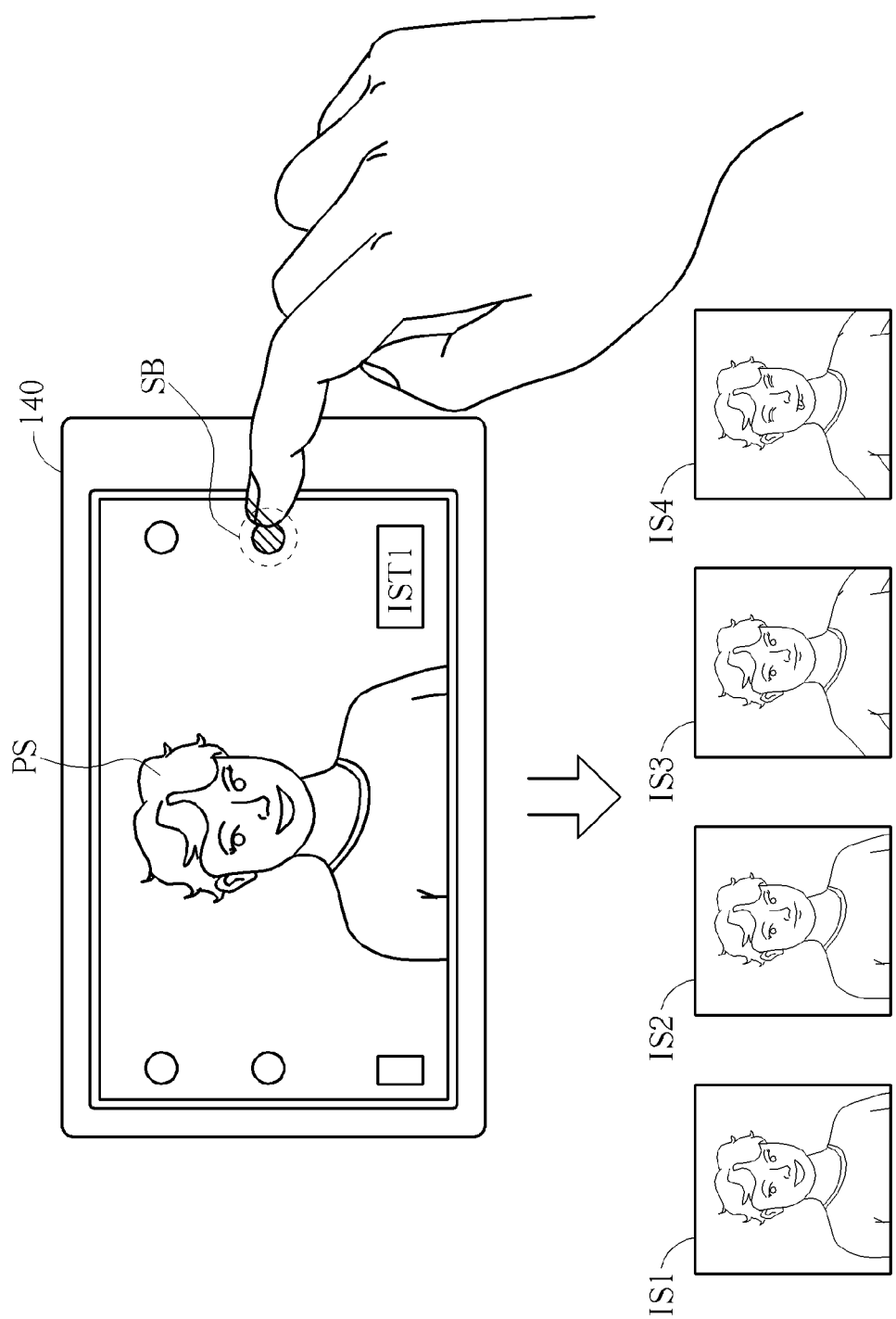

BURST IMAGE CAPTURE METHOD AND IMAGE CAPTURE SYSTEM THEREOF

CROSS REFERENCE TO RELATED APPLICATIONS

This application claims priority of U.S. Provisional Application No. 61/602,616 filed on Feb. 24, 2012.

BACKGROUND OF THE INVENTION

1. Field of the Invention

The present invention discloses an image capture method and an image capture system thereof; more particularly, a burst image capture method of providing image frames along separate paths for preview and buffering concurrently.

2. Description of the Prior Art

As the popularity of portable devices increases hugely, functions equipped within the portable device becomes more variant. One of important functions that are widely used by consumers is image capture, such as camera. However, image capture operation of a portable device is often limited by its slow performance. When user launches the camera application, the camera of the portable device is in a preview mode and provides preview image frames of a scene on the display screen at first. When user desires to take a photo of a certain scene and triggers the shutter button (for example press shutter icon on the touch screen), the camera switches from preview mode to capture mode, and the preview of image frames would stop refreshing and the portable device is temporarily occupied by processing the captured image frame. As a result, if a user desires to capture multiple image frames, the time required to capture all image frames would be significantly long due to the camera has to switch in between preview mode and capture mode, and thus cannot provide burst photo within a short time. This is because that the camera provides preview of image frames in low resolution, but in capture mode, the image frames are captured in high resolution comparing with preview mode. Consequently, the camera needs to spend time to configure settings in response to mode change.

Another conventional way of performing burst image capture is to use the low resolution image frames in preview mode as captured image frames in capture mode. This can save the delay caused by mode change. However, the image quality may not be satisfying, and still the display screen is idled from refresh. Such kind of burst image capture generally performs image capture of predetermined number of image frames, which means that when user triggers such burst capture, the camera automatically captures the predetermined number of image frames. While the camera is capturing the image frames, the display screen is paused at the image frame previously display (prior to the trigger of burst image capture).

Therefore, there exists a need of an image capture method and system that is capable to capture high resolution image frame continuously without stopping refresh of preview image frame on display screen.

SUMMARY OF THE INVENTION

The claimed invention discloses a burst image capture method. The burst image capture method comprises capturing a first sequence of image frames; generating a second sequence of image frames according to the first sequence of image frames; providing the second sequence of image frames for preview; generating a third sequence of image frames according to the first sequence of image frames and buffering the third sequence of image frames concurrently with the displaying of the second sequence of image frames; receiving an input command; and in response to the input command, extracting a fourth sequence of image frames out of the third sequence of image frames, encoding the fourth sequence of image frames into a fifth sequence of image frames, and storing the fifth sequence of image frames.

The claimed invention discloses an image capture method. The method comprises capturing a sequence of image frames; providing the sequence of image frames for preview along a first path and buffering the sequence of image frames into a buffer along a second path separately and concurrently; receiving an input command via an input interface unit; and in response to the input command, extracting a portion of the sequence of image frames from the buffer and encoding the portion of image frames along the second path; and storing the portion of encoded image frames in a memory unit.

The claimed invention also discloses an image capture system. The image capture system comprises an image sensor module, configured to capture a first sequence of image frames; an image signal processor, configured to generate and provide a second sequence of image frames and a third sequence of image frames according to the first sequence of image frames; a touch screen, configured to display the second sequence of image frames and configured to receive an input command; a backend processing unit, configured to buffer the third sequence of image frames, and in response to the input command, extract a fourth sequence of image frames out of the third sequence of image frames and encode the fourth sequence of image frames into a fifth sequence of image frames; and a memory unit, configured to store the fifth sequence of image frames; wherein the second sequence of image frames and the third sequence of image frames are of different resolutions and provided along separate paths concurrently.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 5 illustrates how a user of the image capture system shown in FIG. 1 triggers a burst image capture operation based on the burst image capture method of the present invention.

DETAILED DESCRIPTION

For overcoming the abovementioned limitations of the prior art while performing fast burst image capture, the present invention discloses a burst image capture method and an image capture system utilizing the continuous image capture method. With the aid of the burst image capture method and the image capture system of the present invention, lags between capturing multiple image frames can be minimized. In addition, a user of the image capture system would benefit from capturing image frames having high resolution by merely using simple input commands.

Figure 1:
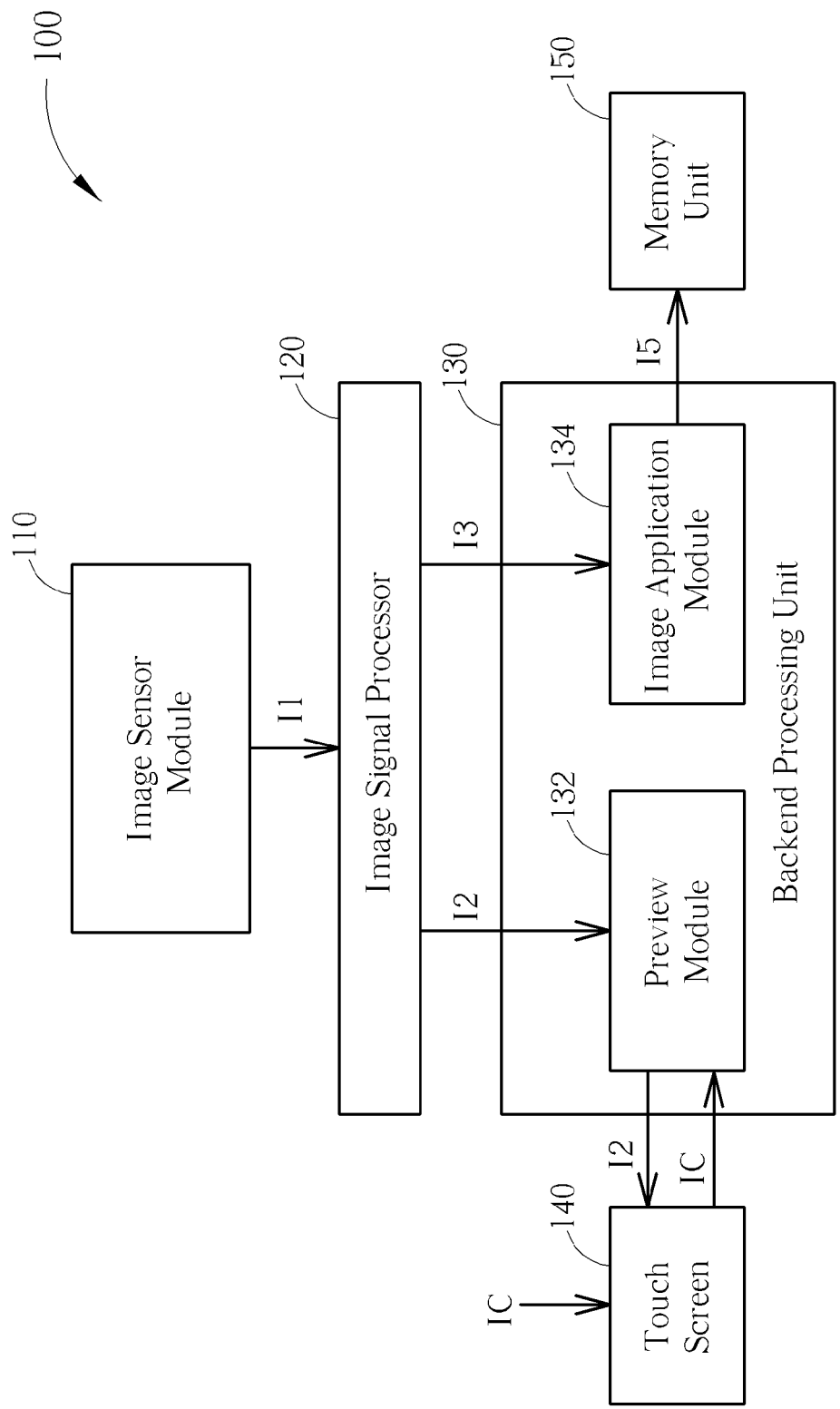
FIG. 1 illustrates an image capture system according to one embodiment of the present invention.

Please refer to FIG. 1, which illustrates an image capture system 100 according to one embodiment of the present invention. As shown in FIG. 1, the image capture system 100 includes an image sensor module 110, an image signal processor 120, a backend processing unit 130, a touch panel 140, and a memory unit 150. Note that the image capture system 100 may be implemented in a mobile electronic device in embodiments of the present invention. The mobile electronic device may be a mobile phone, tablet, PDA, digital camera, digital camcorder, game console, and/or other suitable device, and the image capture system 100 may be implemented as a camera function with burst mode capture.

The image sensor module 110 is configured to capture a sequence of original image frames I1 according to a first setting applied to the image sensor module 110. The first setting comprises resolution, frame rate, exposure and/or others. The image sensor module 110 is also configured to transmit the sequence of original image frames I1 to the image signal processor 120. In one embodiment of the invention, the image sensor module 110 captures the sequence of original image frames I1 in a first resolution, which can be the maximum resolution the image sensor module 110 capable to capture, and provides to the image signal processor 120 in a first frame rate, which can be the maximum frame rate the image sensor module 110 capable to provide.

The image signal processor 120 is configured to generate a sequence of preview image frames I2 and a sequence of intermediate image frames I3, and transmit to the backend processing unit 130. In one embodiment of the present invention, the image signal processor 120 is further configured to scale the sequence of original image frames I1 to generate the sequence of preview image frames I2 in a second resolution, which may be smaller than the first resolution of the original image frames I1 so that the sequence of preview image frames I2 may be displayed and/or further stored as thumbnails. The image signal processor 120 is also configured to scale the sequence of original image frames I1 to generate the sequence of intermediate image frames I3 in a third resolution, which may be equal to or smaller than the original first resolution. Typically, the second resolution of the preview image frames I2 is set equal or smaller than the third resolution of the intermediate image frames I3, depending on system default setting or user setting. Compared with conventional image capture system, the image signal processor 120 of the invention is capable to provide both the sequence of preview image frames I2 and the sequence of intermediate image frames I3 in parallel with different resolutions and/or frame rates to the backend processing unit 130. In one embodiment of the invention, the image signal processor 120 may provide the sequence of preview image frames I2 of the second resolution to the preview module 132 in a second frame rate, and provide the sequence of intermediate image frames I3 of the third resolution to the image application module 134 in a third frame rate, in which the second frame rate is higher than the third frame rate and the second resolution is lower than the third resolution.

The backend processing unit 130 includes a preview module 132 and an image application module 134. The preview module 132 is configured to provide the sequence of preview image frames I2 to the touch panel 140 for displaying. The image application module 134 is configured to buffer the sequence of intermediate image frames I3, extract a sequence of intermediate image frames I4 out of the sequence of intermediate image frames I3, and encode the sequence of intermediate image frames I4 so as to generate a sequence of encoded image frames I5 to the memory unit 150. The image application module 134 may extract the sequence of intermediate image frames I4 in response to a user input received from, for example, the touch screen 140, and encode them into the sequence of encoded image frames I5 of designated format such as JPEG or MPEG, depending system default setting or user setting. The encoding may be performed by a suitable encoder implemented in either by hardware or software. The image application module 134 may also receive the user input via other input interface of the image capture system 100, for example a hardware shutter key. The user input may be a command for capturing burst images, or a series of commands for capturing single image.

Figure 2:
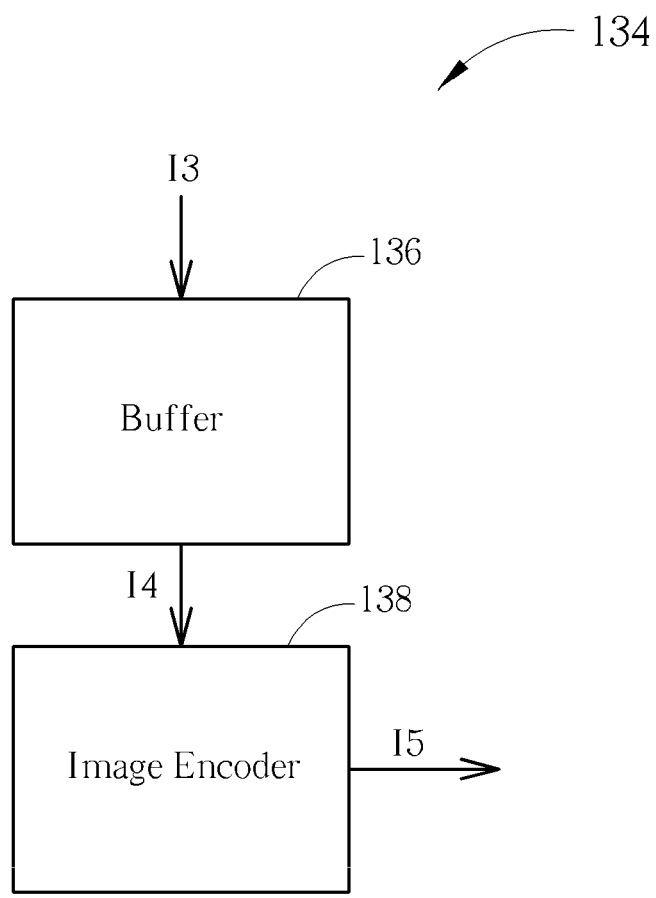
FIG. 2 illustrates a detailed diagram of the image application module shown in FIG. 1 according to one embodiment of the present invention.

Please refer to FIG. 2, which illustrates a detailed diagram of the image application module 134 according to one embodiment of the present invention. As shown in FIG. 2, the image application module 134 includes a buffer 136 and an image encoder 138. The buffer 136 is configured to buffer the sequence of intermediate image frames I3 while the sequence of intermediate image frames I3 are transmitted from the image signal processor 120 in a continuous manner. In one embodiment of the present invention, the buffer 136 is implemented as a ring buffer for continuously buffering the incoming sequence of intermediate image frames I3. In one embodiment of the invention, the buffer 136 is configured to store a predetermined number of intermediate image frames I3, and overwrite the oldest intermediate image frame with the newest intermediate frame continuously. The predetermined number of intermediate image frame I3 may be set to buffer image frames covering a period of time or designated by user. In another embodiment of the invention, the buffer may be allocated specifically for the image capture system 100 or be requested when the image capture system 100 is enabled.

The buffer 136 is also configured to extract the sequence of intermediate image frames I4 out of the sequence of intermediate image frames I3 in response to an input command IC, where the input command IC determines a start and an end of the sequence of intermediate image frames I4. The input command IC may be received via the touch screen 140 or other input interface. The image encoder 138 is configured to encode the sequence of intermediate image frames I4 to generate the sequence of encoded image frames I5, and is configured to transmit the sequence of sequence of encoded image frames I5 to the memory unit 150. The image encoder 138 may be a software encoder or a hardware encoder. A size of the buffer 136 and a processing capability of the image encoder 138 are primary factors of performance efficiency of the backend processing unit 130. In one embodiment of the invention, the buffer 136 continuously receives new intermediate image frames I3 and provides intermediate image frame I4 to the image encoder 138 concurrently.

In one embodiment of the present invention, resolution of the sequence of intermediate image frames I3 or the sequence of encoded image frames I5 is assigned via another input command from the user and is generally higher than the resolution of the sequence of preview image frames I2. However, in another embodiment of the invention, the resolution of the preview image frame I2 can be set the same as the intermediate image frames I3.

The touch screen 140 is configured to display the sequence of preview image frames I2 and is configured to receive the input command IC from the user of the image capture system 100. The input command IC can be a command for launching an image capture application utilizing the burst image capture method of the present invention and/or for performing various image capture operations.

In one embodiment of the present invention, the touch screen 140 may be split into a display unit for displaying the sequence of preview image frames I2 and a touch panel for receiving the input command IC. In another embodiment of the invention, the input command IC may be received via other input mechanism, such as a hardware shutter key dedicated for image capture purpose.

The memory unit 150 is configured to store the sequence of encoded image frames I5. The memory unit 150 may be an eMMC memory, an SD card, a micro SD card and/or other suitable storage device connected internally or externally. In one embodiment of the present invention, the sequence of encoded image frames I5 are stored in the memory unit 150 in JPEG files.

Generally speaking, the image capture system 100 of the invention, particularly the image signal processor 120 and the backend processing unit 130, may process preview image frames and intermediate image frames (which may be encoded and stored as encoded image frames) in parallel by separate processing paths. The image signal processor 120 of the invention is capable to scale original image frames into preview image frames and intermediate image frames in different resolutions and provide them to the preview module 132 and the image application module 134 of the backend processing unit 130 in different frame rates respectively in parallel. Accordingly, the image capture system 100 of the invention may provide preview image frames on the touch screen 140 to the user, meanwhile receive input command IC for performing image capture (processed by the image application module 134) at the same time. The input command IC may be a command for capturing a sequence of image frames, and in response to the input command IC, the buffer 136 provides the sequence of intermediate image frames I4 corresponding to the input command IC to the image encoder for encoding into suitable format. Since the preview image frames I2 and the intermediate image frames I3 are processed by separate paths in parallel, the touch panel 140 can be updated with new image frames and the user is capable to capture burst images in high resolution nearly without delay.

Figure 3:
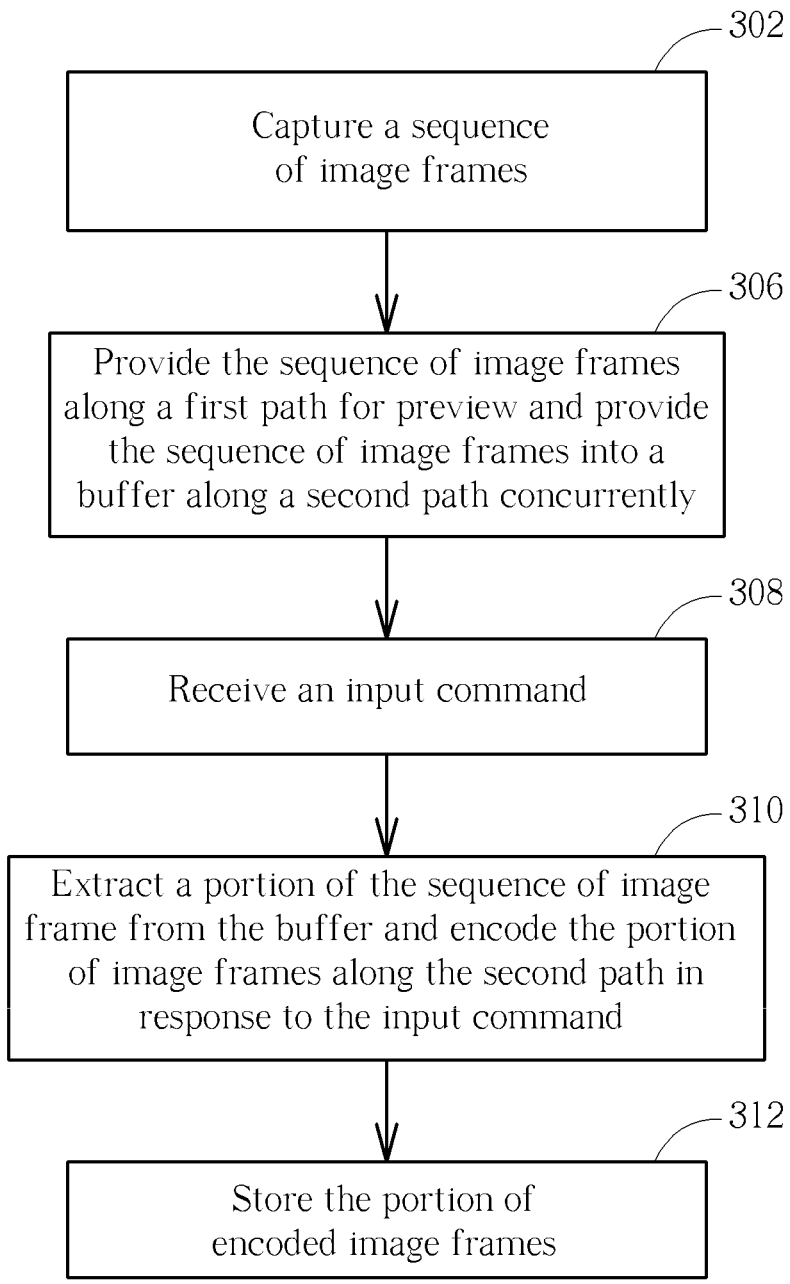
FIGS. 3-4 illustrate image capture methods according to various embodiments of the present invention.

Please refer to FIG. 3, which illustrates a burst image capture method according to a third embodiment of the present invention. As shown in FIG. 3, the burst image capture method comprises the following steps:

Step 302: Capture a sequence of image frames I.

Step 306: Provide the sequence of image frames I along a first path for preview and provide the sequence of image frames I into a buffer along a second path concurrently.

Step 308: Receive an input command IC from a user via a user interface unit.

Step 310: Extract a portion of the sequence of image frame I from the buffer and encode the portion of image frames along the second path in response to the input command IC.

Step 312: Store the portion of encoded image frames.

In Step 302, the image sensor module 110 captures the sequence of image frames I and transmits the sequence of image frames I to the image signal processor 120 continuously once the image capture application is triggered. The image sensor module 110 may captures the sequence of the image frame I in a predetermined resolution at a predetermined frame rate. And the image signal processor 120 may perform various processing on the sequence of image frames I prior to outputting to backend processing unit 130.

In Step 306, the image signal processor 120 provide the sequence of image frames I along two paths: the first path connecting to the preview module 132 and the second path connecting to the image application module 134. By providing the sequence of image frames I in two separate paths, the image capture system 100 is capable to provide preview of image frames and perform image capture of the image frames at the same time. The preview module 132 may process the sequence of image frames I and provides the processed image frames to the touch screen for display, meanwhile the image application module 134 may buffer the sequence of image frames I into the buffer 136 concurrently.

In Steps 308 and 310, in response to an input command received from the user interface unit, for example touch screen 140 of FIG. 1, the image application module extracts a portion of image frames corresponding to the input command from the buffer 136, and encodes the extracted portion of the image frames by the image encoder 138. Please note that in Step 308, the image signal processor 120 continues to provide newly captured image frames to the preview module 132 along the first path and to the buffer 136 along the second path so that both can be updated with new image frames. And the image frames captured and buffered to the buffer 136 during the valid time period of the input command IC would be encoded by the encoder 138 at the same time. The valid time period of input command may be determined by user, for example tap to release, or may be predetermined.

In Step 312, the encoded image frames are stored in memory unit 150 of the image capture system 100. The memory unit 150 may be internal or external storage device, such as SD/micro SD card, eMMC, USB-connected memory, etc.

Figure 4:
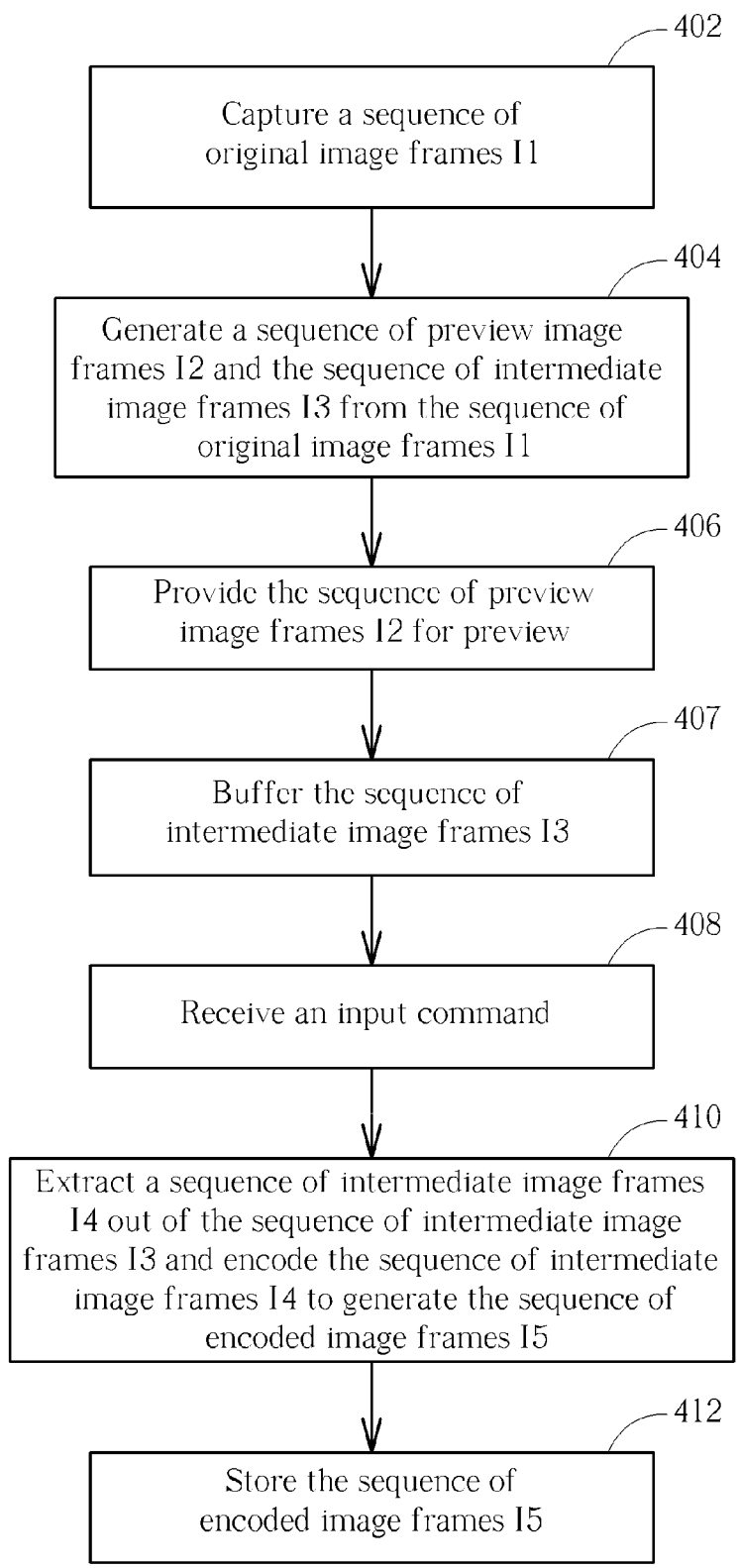

Please refer to FIG. 4, which illustrates the image capture method according to a first embodiment of the present invention. As shown in FIG. 4, the image capture method comprises the following steps:

Step 402: Capture a sequence of original image frames I1.

Step 404: Generate a sequence of preview image frames I2 and the sequence of intermediate image frames I3 from the sequence of original image frames I1. The sequence of preview image frames I2 and the sequence of intermediate image frames I3 may be of different resolutions than the sequence of original image frames I1

Step 406: Provide the sequence of preview image frames I2 to a preview module.

Step 407: Buffer the sequence of intermediate image frames I3 to an image application module. Please note that Steps 406 and 407 are performed concurrently and the preview image frames I2 and the intermediate image frames I3 are provided and buffered in different frame rates.

Step 408: Receive an input command IC for capturing at least an image of a scene. The input command may be received from a touch screen or from a hardware key.

Step 410: Extract a sequence of intermediate image frames I4 out of the sequence of intermediate image frames I3 and encode the sequence of intermediate image frames I4 to generate the sequence of encoded image frames I5. Please note that the sequence of intermediate image frames I4 is a consecutive portion of the sequence of intermediate image frames I3

Step 412: Store the sequence of encoded image frames I5 into a memory unit.

Note that Steps 402-412 may be performed in a continuous manner so that sequences of image frames are consecutively captured, previewed, buffered, encoded, and stored in embodiments of the present invention as long as the image capture system 100 is activated or an image capture application installed on the image capture system 100 is triggered in response to the input command IC.

In Step 402, the image sensor module 110 captures the sequence of original image frames I1 and transmits the sequence of original image frames I1 to the image signal processor 120 continuously once the image capture application is triggered. The image sensor module 110 may captures the sequence of the original image frame I1 in a predetermined resolution at a predetermined frame rate.

In Step 404, the image signal processor 120 generates the sequence of image frames I2 and the sequence of intermediate image frames I3 from the sequence of original image frames I1 according to a first setting, which indicates the resolution of the sequence of preview image frames I2 and the resolution of the sequence of intermediate image frames I3. Note that in one embodiment related to the steps shown in FIG. 4, the resolution of the sequence of preview image frames I2 is lower than the resolution of the sequence of original image frames I1 and the sequence of preview image frames I2 may be optionally scaled-down. And the resolution of the sequence of intermediate image frames I3 is higher than the resolution of the sequence of preview images I2, and is lower than or equal to the resolution of the sequence of original image frames I1. Also note that the first setting may be dynamically changed by the user of the image capture system 100 via an input setting command received from the touch screen 140, for example, the input command IC or another input command. In some embodiments of the present invention, a frame rate of capturing the sequence of original image frames I1 by the image sensor module 110 may also be set in the first setting via the input command IC or another input command, for example, 4 or 5 image frames per second. In addition, the frame rate of providing the preview image frames I2 may be different than the frame rate of buffering the intermediate image frame I3. For example, the preview image frame rate may be set higher than the buffering frame rate.

In Step 406, the preview module 132 directs the sequence of preview image frames I2 to the touch screen 140 for displaying to the user. In Step 407, the image application module 134 buffers the sequence of intermediate image frames I3 into the buffer 136. Please note that displaying of the preview image frames I2 and buffering of the intermediate image frames I3 are performed concurrently in parallel by the back-end processing unit 130.

In Step 408, when the user of the image capture system 100 sees the sequence of preview image frames I2 on the touch screen 140, for example, as a preview image frame stream including a consecutive plurality of preview image frames, and the user may trigger an input command IC for capturing one or more image frames, for example via the touch screen 140. The touch screen 140 receives the input command IC by detecting finger touch on the touch screen 140. An image capture operation is therefore triggered in response to the input command IC.

In Step 410, after the image capture operation is triggered in response to the input command IC, the image capturing module 134 starts extracting the sequence of intermediate image frames I4 out of the sequence of intermediate image frames I3 from the buffer 136, and the image encoder 138 encodes the sequence of intermediate image frames I4 into the sequence of encoded image frames I5, for example, as an encoded image frame stream while the image capture operation is triggered in a continuous manner.

In Step 412, the sequence of encoded image frames I5 are stored in the memory unit 150 for future browsing or further processing.

Note that Steps 408-412 may be continuously performed in response to the input command IC when the input command IC is continuously triggered. Actually, the input command IC may be regarded as a combination of two input commands, a first one of which is configured to activate the image capture operation and a second one of which is configured to terminate the image capture operation, i.e. stop execution of the first input command. More specifically, in one embodiment of the present invention, the first input command is triggered by pressing a long tap on the touch screen 140, and the second touch command is triggered by releasing the long tap from the touch screen 140. In another embodiment, the first input command is triggered by pressing a first short tap on the touch screen 140 and releasing the first short tap from the touch screen 140 right away, and the second input command is triggered by pressing a second short tap on the touch screen 140 and releasing the second short tap from the touch panel 140 right away. Yet in another embodiment of the present invention, the input command IC is triggered and terminated by a single tap on the touch screen 140.

As a result of the burst image capture method shown in FIG. 4, prior to the user of the image capture system 100 triggers the input command IC via the touch screen 140 like pressing a shutter of the image capture system 100, the sequence of original image frames I1 are continuously captured by the image sensor module 110. The sequence of preview image frames I2 are continuously displayed on the touch panel 140, and the sequence of intermediate image frames I3 are continuously buffered in the buffer 136. Upon the user of the image capture system 100 triggers the input command IC corresponding to an image capture operation and until the user stops execution of the image capture operation, the buffer 136 continuously extracts the sequence of intermediate image frames I4 out of the buffered sequence of intermediate image frames I3 to the image encoder 138, the image encoder 138 continuously encodes the extracted sequence of intermediate image frames I4 to generate the sequence of encoded image frames I5. And the memory unit 150 continuously stores the sequence of encoded intermediate image frames I5. Please note that operations of the buffer 136, the image encoder 138 and the memory unit 150 are executed in parallel so that processing of the image frames would not be delayed. For example, a first image frame is stored into the memory unit 150 and a second image frame is encoded by the image encoder 138 and a third image frame is buffered into the buffer 136 at the same time. The first image frame is captured prior to the second image frame, and the second image frame is captured prior to the third image frame.

In aspects of user experience, the user of the image capture system 100 can benefit from utilizing a fast burst image capture operation since the image sensor module 110 needs not switch resolution setting among preview mode and capture mode. Instead, the image signal processor 120 separates the image frames for preview and for image capture so that the image sensor module 110 is freed from switching its settings repeatedly in comparison to conventional image capture system of mobile electronic device. With the aid of the image capture system of the present invention, the lags occur between capturing two consequent image frames in the conventional mobile electronic device can be successfully prevented.

Please refer to FIG. 5, which illustrates how a user of the image capture system 100 can trigger a burst image capture operation based on the burst image capture method of the present invention. As shown in FIG. 5, a sequence of image frames of a person PS who is currently detected in a scene by the image sensor module 110 is displayed on the touch screen 140.

As mentioned, in one embodiment of the present invention, the user is able to tap and hold on a shutter button SB displayed on the touch screen 140 to continuously capture a sequence of image frames IS1, IS2, IS3, IS4, . . . and etc. until the user releases tap from the shutter button SB to terminate the image capture, i.e. the user may use a long tap to activate the image capture operation.

As mentioned above, in another embodiment of the present invention, the user is able to give a first short tap on the shutter button SB and release the first short tap from the shutter button SB right away for continuously capturing multiple image frames until the user gives a second short tap on the shutter button SB to terminate the execution of the image capture. That is, the user may use the first short tap to activate the burst image capture operation of the image capture system. 100 and may use the second short tap to terminate the burst image capture operation.

In addition, the touch screen 140 may display thumbnails IST1, IST2, etc. of captured image frames. The thumbnails are generated from preview image frame corresponding to the captured image frames and can displayed with the preview image frames at the same time. When performing image capture operation, the touch screen 140 is updated with the thumbnail of the latest captured image frame of the sequence of image frame IS. When the image capture operation terminates, the touch screen 140 can display thumbnail of the last captured image frame without further update. In one embodiment of the invention, the touch screen 140 may concurrently update the display of preview image frames and the display of thumbnails concurrently during execution of the image capture operation. In another embodiment of the invention, the touch screen 140 may only update either the preview image frame or the thumbnail.

The present invention discloses a burst image capture method and an image capture system utilizing the burst image capture method for the purpose of overcoming the tradeoff between the image capturing time and the resolution occurring in the prior art. By separating the image frames for previewing and for buffering/encoding, a fast and burst image capture operation can be achieved, and even the "zero shutter-lag" performance may also be fulfilled with the aid of the disclosed burst image capture method of the disclosed image capture system of the present invention.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A burst image capture method, comprising:
   capturing a first continuous sequence of image frames;
   concurrently generating a second and a third sequence of image frames according to the first sequence of image frames;
   buffering the third sequence of image frames concurrently with continuous displaying of the second sequence of image frames;
   receiving an input command; and
   in response to the input command, while continuing the continuous displaying of the second sequence of image frames, extracting a fourth sequence of image frames out of the third sequence of image frames, encoding the fourth sequence of image frames into a fifth sequence of image frames, and storing the fifth sequence of image frames;
   wherein the third, fourth, and fifth sequences of image frames are not displayed while displaying the second sequence of image frames.

2. The burst image capture method of claim 1, wherein the input command is triggered by pressing a long tap on a touch screen, and terminated by releasing the long tap from the touch screen.

3. The burst image capture method of claim 1, wherein the input command is triggered by pressing a first short tap on a touch screen and releasing the first short tap from the touch screen right away, and the input command is terminated by pressing a second short tap on the touch screen and releasing the second short tap from the touch screen right away.

4. The burst image capture method of claim 1, wherein the first sequence image frames, the second image frames and the third image frames are of different resolution respectively.

5. The burst image capture method of claim 4, wherein the second sequence of image frames are of lower resolution than the third sequence of image frames.

6. The burst image capture method of claim 4, wherein the second sequence of image frames and the third sequence of image frames are displayed and buffered at different frame rates respectively.

7. The burst image capture method of claim 1, wherein the fifth sequence of image frames are stored in JPEG format.

8. An image capture method, comprising:
   capturing a sequence of image frames;
   providing the sequence of image frames for continuous displaying along a first path and buffering the sequence of image frames into a buffer along a second path separately and concurrently;
   receiving an input command via an input interface unit; and
   in response to the input command, while continuing the continuous displaying of the sequence of image frames along the first path, extracting a portion of the sequence of image frames from the buffer and encoding the portion of image frames along the second path; and
   storing the portion of encoded image frames in a memory unit along the second path;
   wherein image frames along the second path are not displayed while displaying the sequence of image frames along the first path.

9. The image capture method of claim 8, wherein the sequence of image frames is captured by a first resolution, provided along the first path by a second resolution and provided along the second path by a third resolution.

10. The image capture method of claim 9, wherein the first resolution is higher than the third resolution, and the third resolution is higher than the second resolution.

11. The image capture method of claim 8, wherein the extracting and encoding of the portion of the image frames along the second path are performed concurrently with the providing of the sequence of image frames for continuous displaying along the first path.

12. The image capture method of claim 8, wherein the receiving of the input command further comprises:
   detecting a tap and hold on the input interface unit;
   starting extracting and encoding the portion of image frames in response to the tap and hold;
   detecting a release of the tap and hold on the interface unit; and
   terminating extracting and encoding the portion of the image frames in response to the release.

13. The image capture method of claim 8, wherein the sequence of image frames is provided along the first path at a first frame rate and buffered along the second path at a second frame rate, the first frame rate is higher than the second frame rate.

14. An image capture system, comprising:
- an image sensor module, configured to capture a first sequence of image frames;
- an image signal processor, configured to generate and provide a second sequence of image frames and a third sequence of image frames according to the first sequence of image frames, and further configured to buffer the third sequence of image frames concurrently with continuous display of the second sequence of image frames;
- a touch screen, configured to continuously display the second sequence of image frames and configured to receive an input command;
- a backend processing unit, configured to buffer the third sequence of image frames, and in response to the input command, while continuing the continuous display of the second sequence of image frames, extract a fourth sequence of image frames out of the third sequence of image frames and encode the fourth sequence of image frames into a fifth sequence of image frames; and
- a memory unit, configured to store the fifth sequence of image frames;
- wherein the second sequence of image frames and the third sequence of image frames are of different resolutions and provided along separate paths concurrently and the third, fourth, and fifth sequences of image frames are not displayed while displaying the second sequence of image frames.

15. The image capture system of claim 14, wherein the backend processing unit further comprises:
- a preview module configured to receive and provide the second sequence of image frames to the touch screen along a first path;
- a buffer, configured to buffer the third sequence of image frames concurrently with the display of the second sequence of image frames on the touch screen along a second path; and
- an image encoder, configured to encode the fourth sequence of image frames into the fifth sequence of image frames in response to the input command;
- wherein the fourth sequence of image frames is a continuous portion of the third sequence of image frames.

16. The image capture system of claim 15, wherein the image signal processor is further configured to provide the second sequence of image frames to the preview module at a first frame rate and provide the third sequence of image frames to the buffer at a second frame rate; and wherein the first frame rate is higher than the second frame rate.

17. The image capture system of claim 14, wherein the input command is triggered by pressing a long tap on the touch screen, and is terminated by releasing the long tap from the touch screen.

18. The image capture system of claim 17, wherein the resolution of the first sequence of image frames is higher than the resolution of the third sequence of image frames, and the resolution of the third sequence of image frames is higher than the resolution of the second sequence of image frames.

19. The image capture system of claim 14, wherein the touch screen is further configured to provide thumbnails corresponding to the fifth sequence of image frames concurrently with the display of the second sequence of image frames during execution of the input command.

20. The image capture system of claim 19, wherein the preview module is further configured to generate the thumbnails from a corresponding portion of the second sequence of image frames.

* * * * *